(12) United States Patent
Cheng et al.

(10) Patent No.: US 6,976,764 B2
(45) Date of Patent: Dec. 20, 2005

(54) LASER GUIDING DEVICE FOR TILE CUTTING MACHINE

(75) Inventors: Chin Ming Cheng, Taiping (TW); Chou Jenq Lin, TaLi (TW)

(73) Assignee: Motomax Electric Co., Ltd., Taiping (TW)

( * ) Notice: Subject to any disclaimer, the term of this patent is extended or adjusted under 35 U.S.C. 154(b) by 0 days.

(21) Appl. No.: 10/704,799

(22) Filed: Nov. 12, 2003

(65) Prior Publication Data

US 2005/0099794 A1   May 12, 2005

(51) Int. Cl.7 .............................................. F21V 33/00
(52) U.S. Cl. ........................... 362/89; 362/259; 83/521
(58) Field of Search .......................... 362/89, 253, 259; 83/520, 521

(56) References Cited

U.S. PATENT DOCUMENTS 5,967,645 A * 10/1999 Anderson .................... 362/259
2003/0097922 A1 * 5/2003 Chen ............................ 83/520

* cited by examiner

Primary Examiner—Stephen F Husar
(74) Attorney, Agent, or Firm—Bacon & Thomas, PLLC

(57) ABSTRACT

A laser guiding device is adjustably connected to a support frame on a top of the tile cutting machine and includes a frame in which a laser generating piece is received. An adjusting screw threadedly and transversely extends through the frame and is rotatably connected between two side walls of the support member such that the laser generating piece is moved in the direction of the adjusting screw to generate a laser beam on the tile to be cut. The laser beam is visible regardless of the surface condition of the tile and the debris during cutting.

5 Claims, 7 Drawing Sheets

US 6,976,764 B2

LASER GUIDING DEVICE FOR TILE CUTTING MACHINE

FIELD OF THE INVENTION

The present invention relates to a laser guiding device adjustably connected to a support member so as to generate a guiding line on the tile to be cut.

BACKGROUND OF THE INVENTION

A conventional tile cutting machine used to cut a tile is shown in FIG. 1 and generally includes a base 11 having a top surface 12 on which a tile 15 to be cut is put. A rotating blade 13 is received in a slot defined through the base 11 and a fence 17 is pivotably mounted above the blade 13. A gauge 14 is located on a side of the base 11 and a clamping device 16 is slidably connected to the gauge 14 such that a corner is engaged with the recess in the clamping device 16 and moved together with the clamping device 16 toward the blade 13. A cutting line is pre-set on the surface of the tile 15 so that the user may position the tile 15 by the clamping device 16 properly to allow the blade 13 to cut the tile along the cutting line. Nevertheless, the surface of the tile 15 may not be suitable to draw a line thereon and the line can be covered by the debris during operation so that the user has to carefully position the tile before processing the cutting and stop frequently to make sure that the cutting line is visible.

The present invention intends to provide a laser guiding device that generates a laser line on the tile to be cut and the laser guiding device is conveniently adjustable relative to the, tile.

SUMMARY OF THE INVENTION

The present invention relates to a laser guiding device for a tile cutting machine and comprises a support member fixed on the base of the tile cutting machine and a power supply assembly is received in a chamber in the support member. A lens is connected to an end of the support member. A laser generating assembly is connected to the support member and comprises a frame through which a laser generating piece is received and located in aligned with the lens. An adjusting screw threadedly extends through a threaded hole defined through the frame and is rested on two side walls of the support member such that the frame is adjustably moved along the adjusting screw when rotating the adjusting screw.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
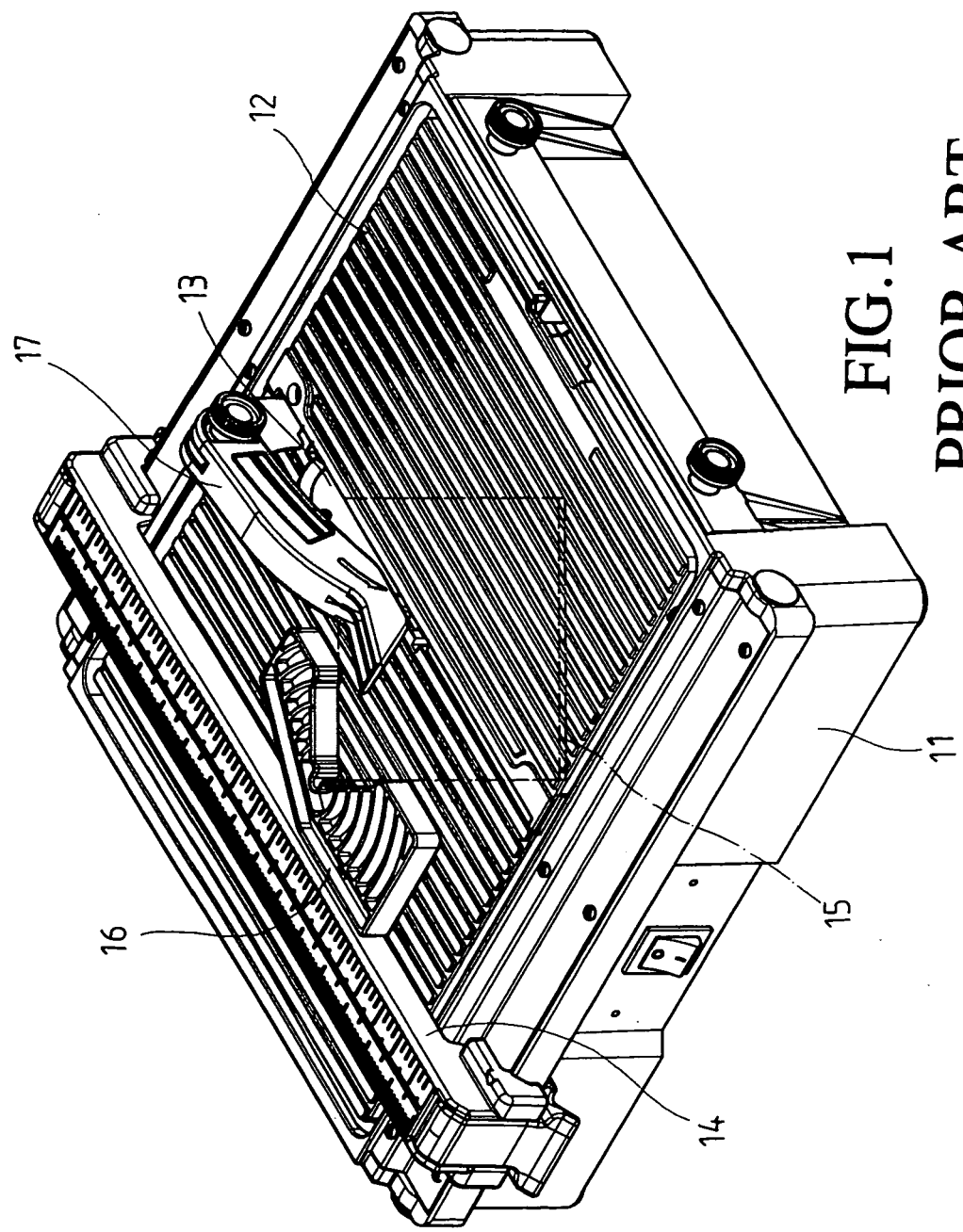
FIG. 1 is a perspective view to show the conventional tile cutting machine.
Figure 2:
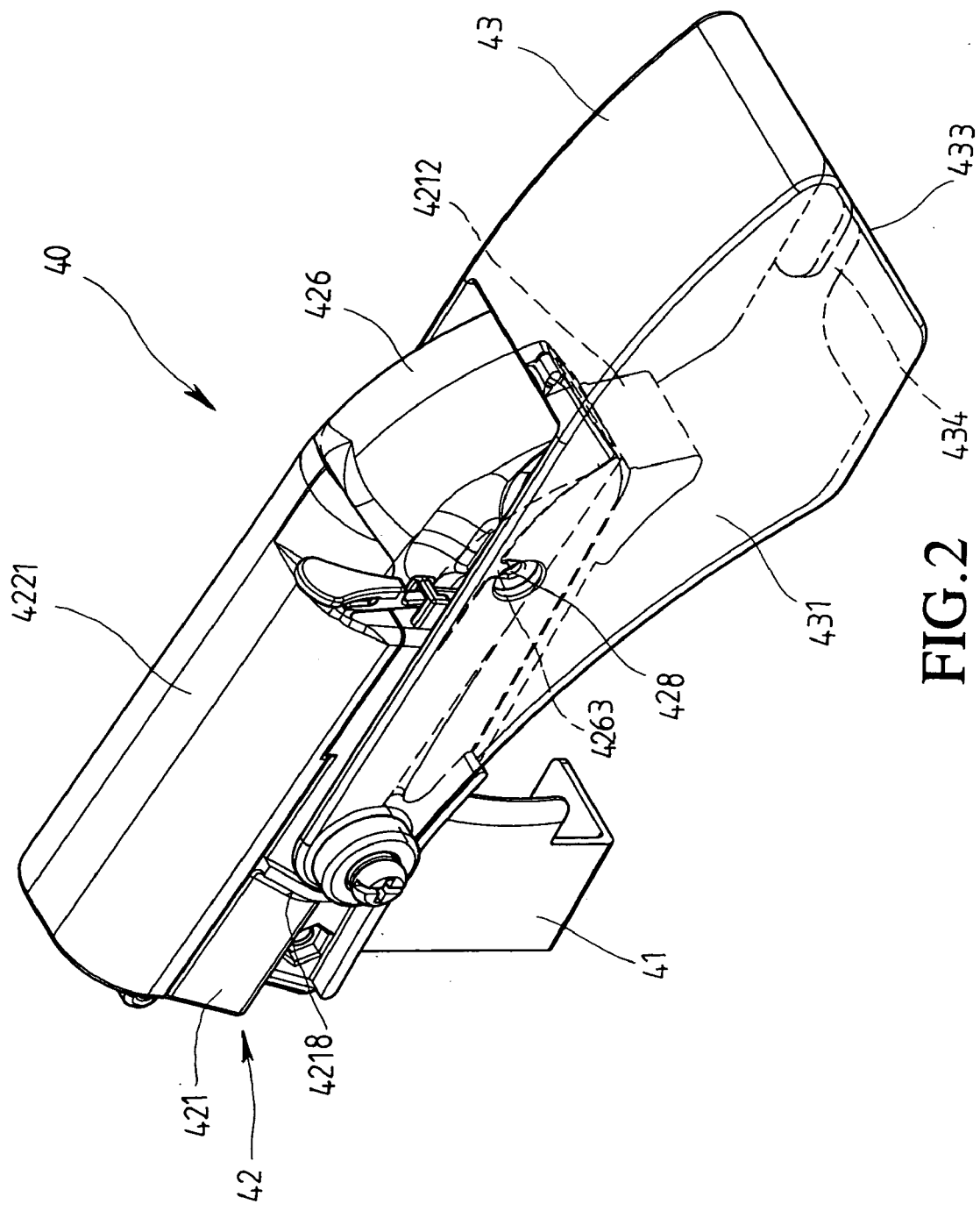
FIG. 2 is a perspective view to show the laser guiding device of the present invention.
Figure 3:
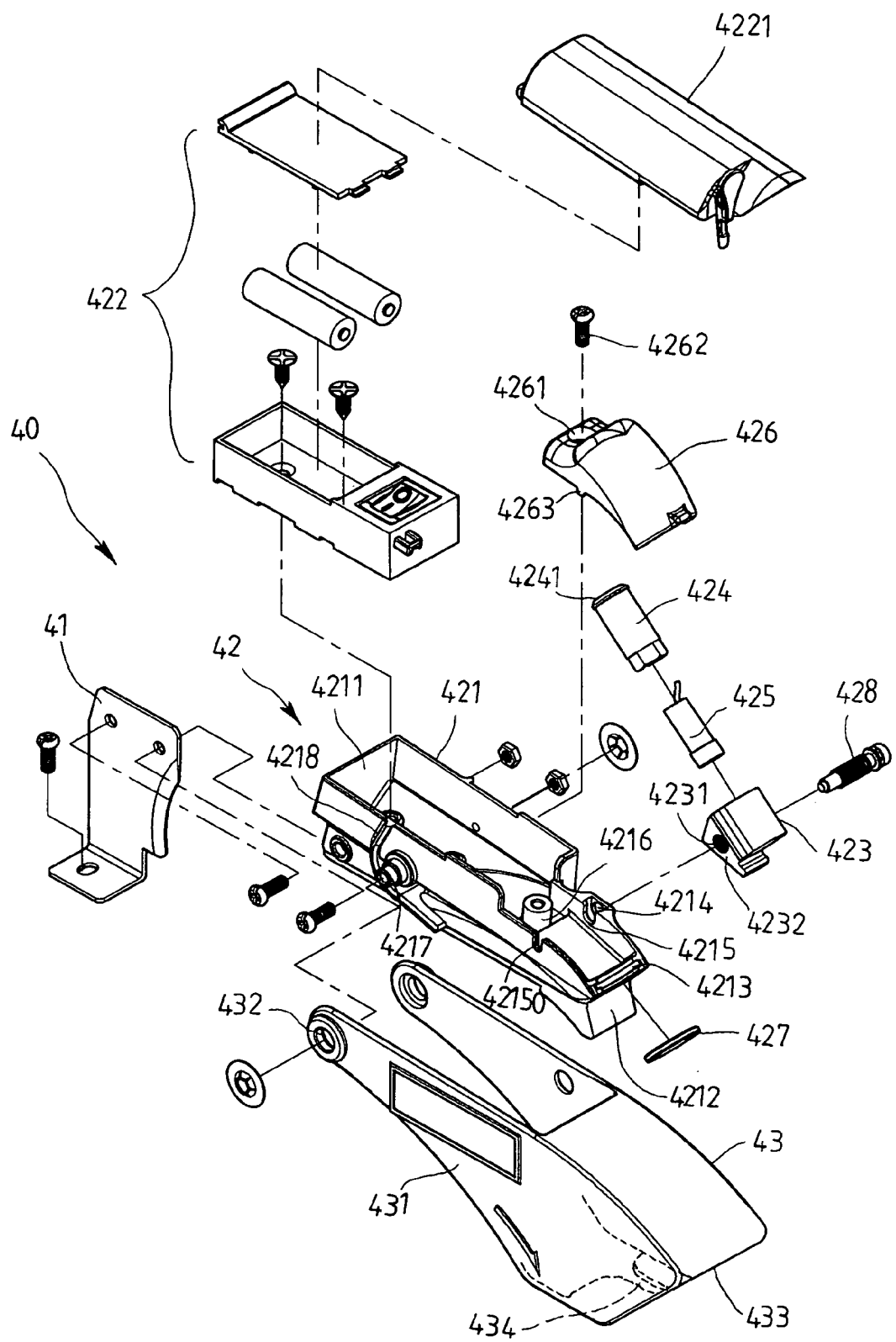
FIG. 3 is an exploded view to show the laser guiding device of the present invention.
Figure 4:
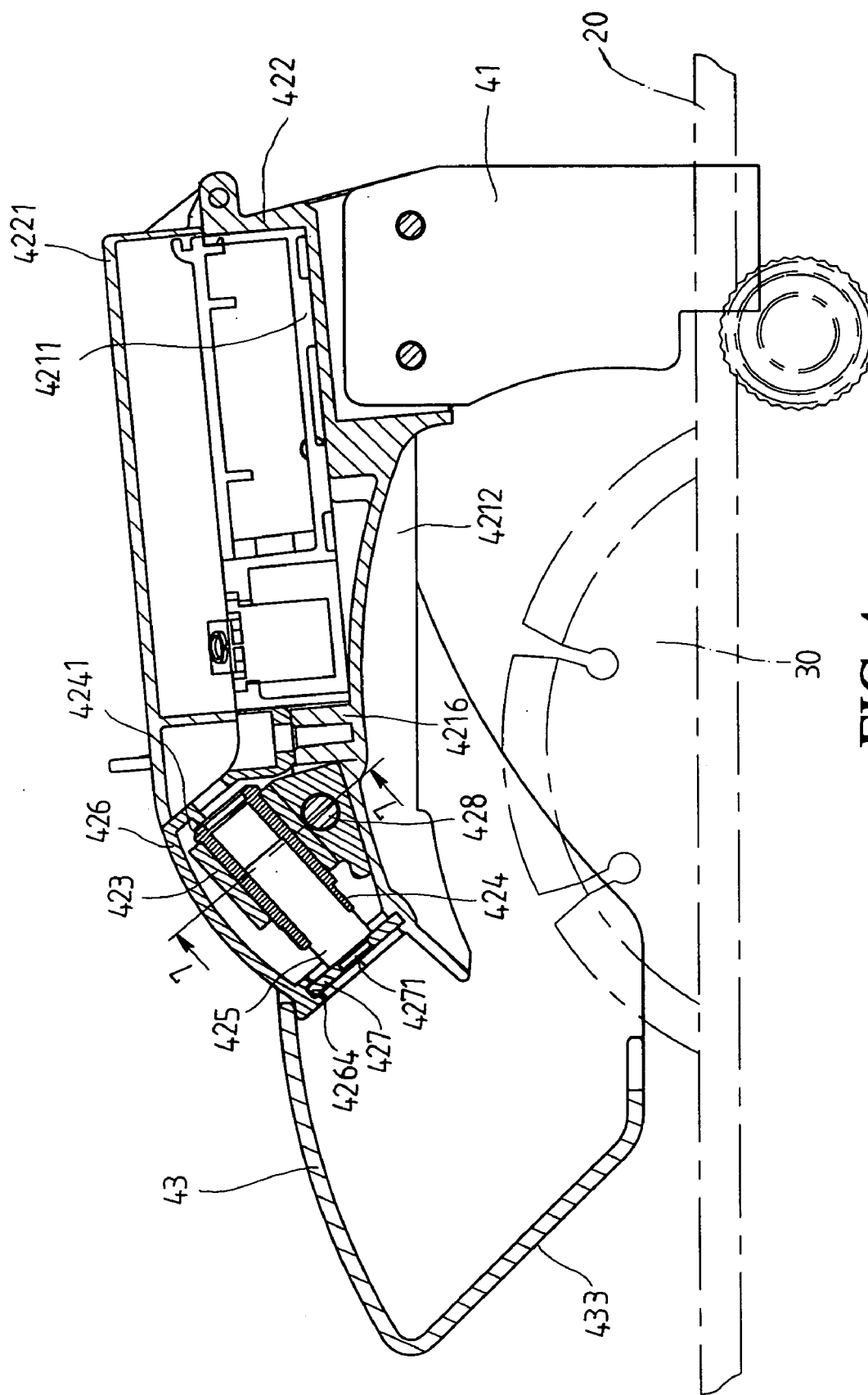
FIG. 4 shows a cross sectional view of the laser guiding device of the present invention.
Figure 5:
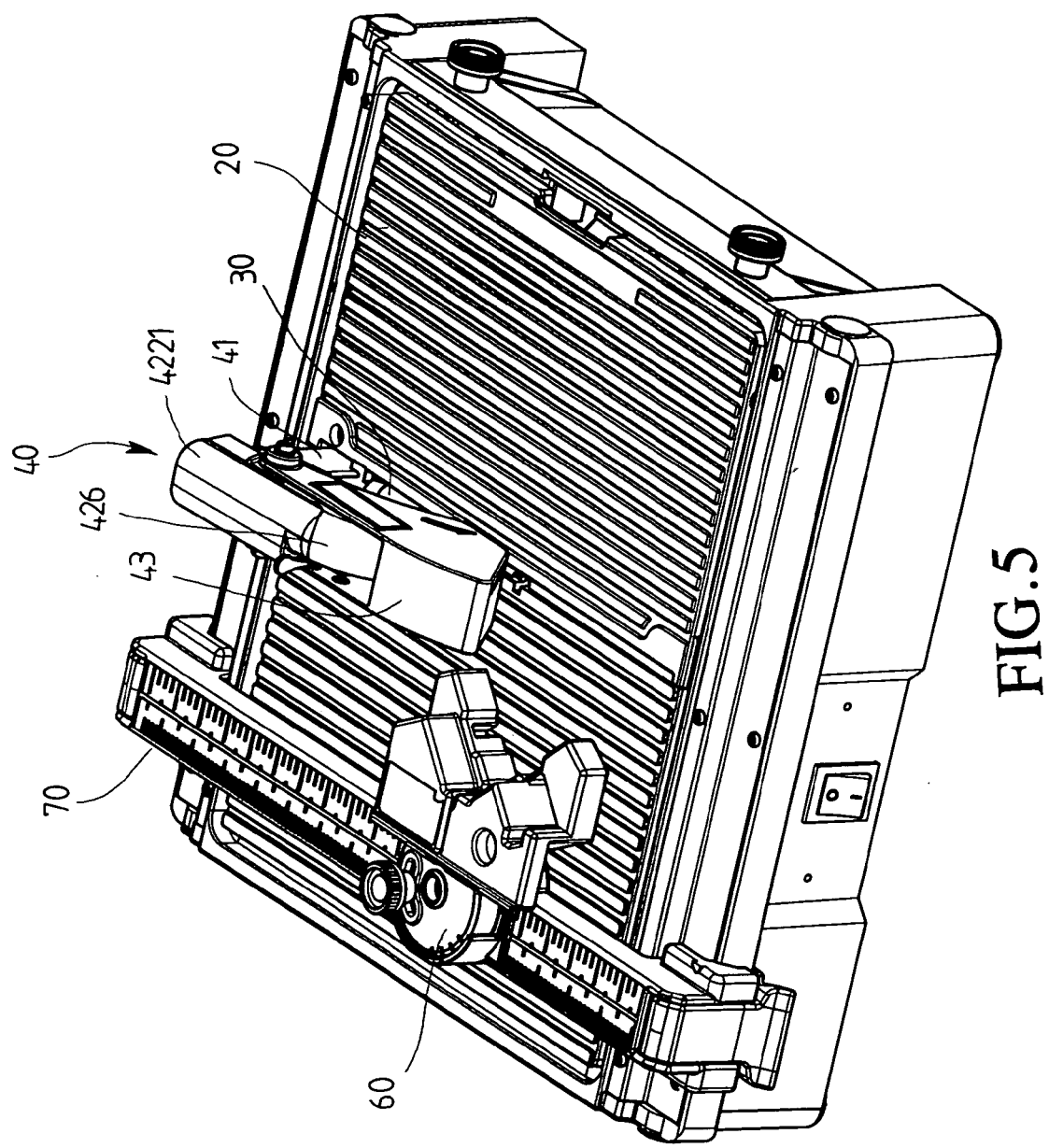
FIG. 5 is a perspective view to show the laser guiding device of the present invention connected on a tile cutting machine.

Referring to FIGS. 1 to 5, the laser guiding device 40 of the present invention is installed on a tile cutting machine which includes a base 20 with a gauge 70 on a side of the base 20 and a rotating blade 30 extends from a top surface of the base 20. The laser guiding device 40 is connected above the rotating blade 30. A clamping device 60 is slidably connected to the gauge 70 so as to clamp a tile 50 and the tile 50 is moved with the clamping device 60.

The laser guiding device 40 comprises a support member 42 which is fixed on the base 20 by an L-shaped member 41 includes a chamber 4211 in which a power supply assembly 422 is received. The power supply 422 has a cover 4221 to covering a top of the assembly 422. Two shafts 4217 extend from two sides of the support member 42 and two curved flanges 4218 are connected on the outside of the two sides of the support member 421. A water seal peripheral wall 4212 extends from an underside of the support member 421 and a lens 427 is engaged with a slot 4213 defined in a top of an end of the support member 42. The support member 42 includes a first side wall and a second side wall which is located in parallel to the first side wall. A recess 4215 is defined in a top edge of the first side wall of the support member 42 and a hole 4214 is defined through an outside of the first side wall and in communication with the recess 4215. The second side wall has a notch 42150 defined in a top edge thereof and located corresponding to the recess 4215.

A laser generating assembly is connected to the support member 42 and comprises a frame 423 which has a support base 4232 and a laser generating piece 425 is received the frame 423 and located in aligned with the lens 427. A sleeve 424 with a stop flange 4241 is mounted to the laser generating piece 425 and the stop flange 4241 is engaged with an end of the frame 423. Further referring to FIG. 7, an adjusting screw 428 has a head rotatably retained in the recess 4215 and being accessed via the hole 4214. The adjusting screw 428 threadedly extends through a threaded hole 4231 defined through support base 4232 of the frame 423 and is rested on the first and second side walls of the support member 42 such that the frame 423 is adjustably moved along a longitudinal axis of the adjusting screw 428 when rotating the adjusting screw 428. A cover 426 has a first end thereof fixed to the support member 42 by extending a bolt 4262 through a hole 4261 in the first end of the cover 426 and being fixed to a connection tube 4216 on the support member 421, and a second end of the cover 426 includes a slot 4264 so as to receive a part of the lens 427. The laser generating piece 425 is covered by the cover 426. The cover 426 further has a protrusion 4263 which is engaged with the notch 42150 so as to press on a distal end of the adjusting screw 428 in the notch 42150.

Figure 6:
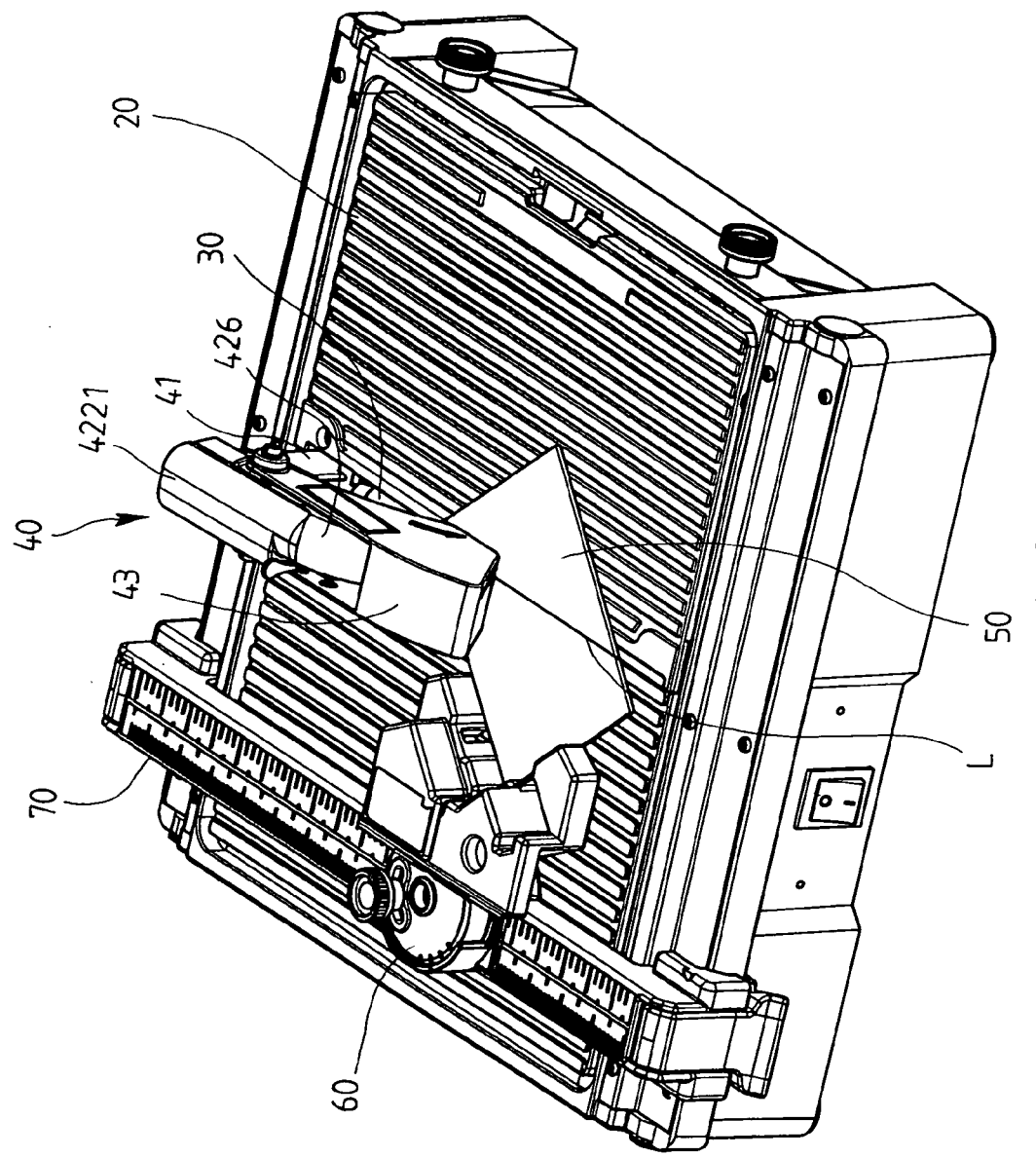
FIG. 6 shows a laser beam is marked on the tile to be cut.

A fence 43 includes two side plates 431 and a transverse plate 433 is connected between the two side plates 431. The two side plates 431 each have a hole 432 through which the two shafts 4217 extend so that the fence 43 is pivotably mounted to the two shafts 4217 extending from two sides of the support member 421. A through hole 434 is defined through the transverse plate 433 and located in alignment with the laser generating piece 425 such that a laser beam "L" as shown in FIG. 6 passes through the hole 434 and is seen on the tile 50 to be cut. The two distal ends of the two side plates 431 each have a round end which are rotatably engaged with the curved flanges 4218.

Figure 7:
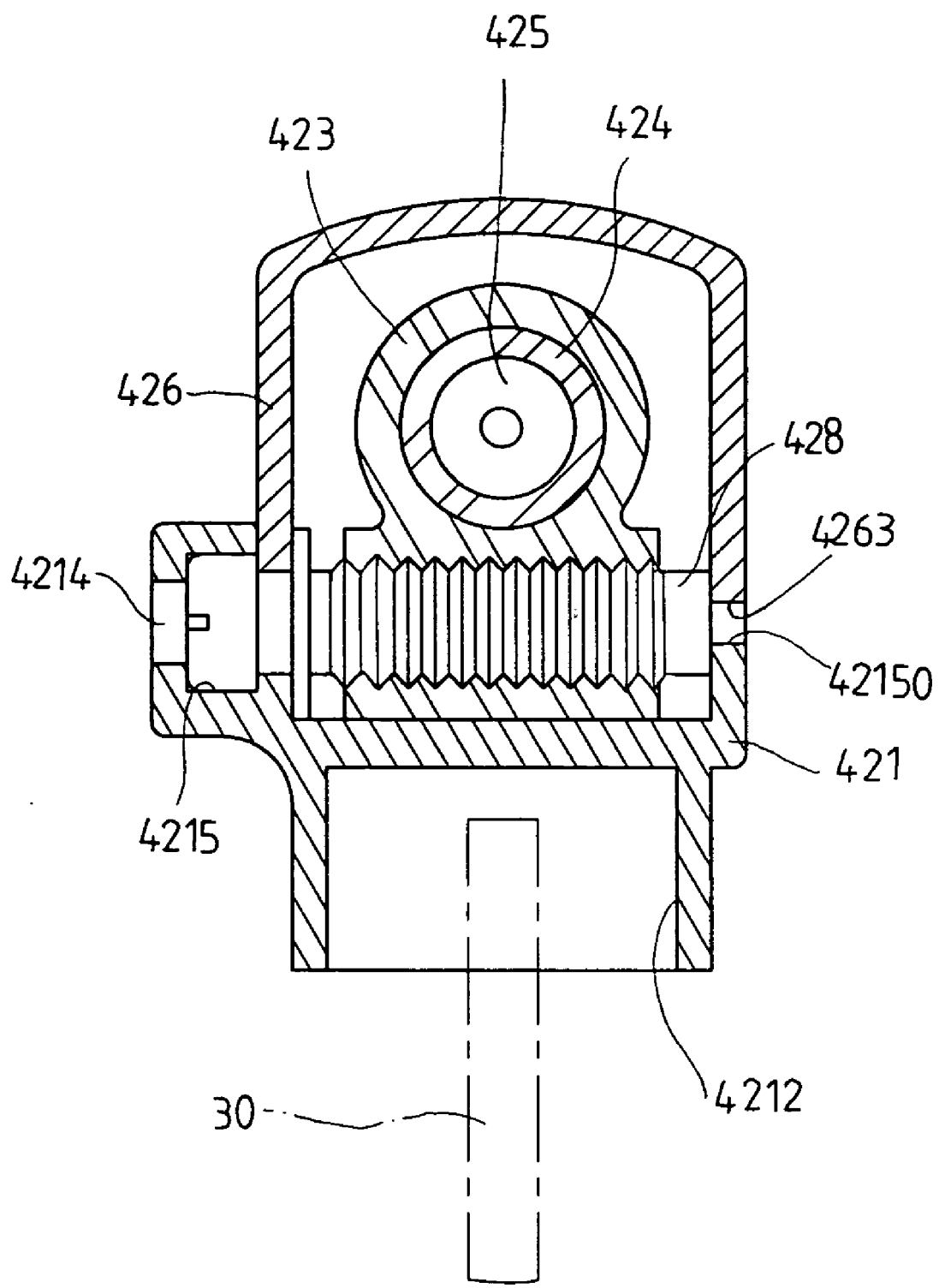
FIG. 7 is a cross sectional view to show the connection between the adjusting screw and the laser generating piece which can be moved relative to the rotating blade.

As shown in FIGS. 6 and 7, the laser beam "L" is conveniently adjusted by rotating the adjusting screw 428 such that the laser generating piece 425 can be moved relative to the rotating blade 30. The laser beam "L" is visible regardless of the surface condition of the tile 50 and the debris or water on the tile 50 during cutting.

While we have shown and described the embodiment in accordance with the present invention, it should be clear to those skilled in the art that further embodiments may be made without departing from the scope of the present invention

What is claimed is:

1. A laser guiding device for a tile cutting machine which includes a base with a gauge on a side of the base and a rotating blade extending from a top surface of the base, a clamping device slidably connected to the gauge so as to clamp a tile, the laser guiding device comprising:

a support member adapted to be fixed on the base and a power supply assembly received in a chamber in the support member, a lens connected to a first end of the support member, and a laser generating assembly connected to the support member and comprising a frame through which a laser generating piece is received and located in aligned with the lens, an adjusting screw threadedly extending through a threaded hole defined through the frame and rested on two side walls of the support member such that the frame is adjustably moved along the adjusting screw when rotating the adjusting screw.

2. The device as claimed in claim 1, wherein a cover has a first end fixed to the support member and a second end of the cover includes a slot so as to receive a part of the lens, the laser generating piece being covered by the cover.

3. The device as claimed in claim 1, wherein the two side walls of the support member includes a first side wall and a second side wall which is located in parallel to the first side wall, a recess defined in a top edge of the first side wall of the support member and a hole defined through an outside of the first side wall and in communication with the recess, the adjusting screw having a head rotatably retained in the recess and being accessed via the hole.

4. The device as claimed in claim 3, wherein the second side wall has a notch defined in a top edge thereof and the cover has a protrusion which is engaged with the notch, the protrusion including a hole for an end of the adjusting screw to be rotatably engaged therewith.

5. The device as claimed in claim 1 further comprising a fence including two side plates and a transverse plate connected between the two side plates, the two side plates pivotably mounted to two shafts extending from two sides of the support member and a through hole defined through the transverse plate, the through hole located in alignment with the laser generating piece.

* * * * *